SOUND REPRODUCING DEVICE

Filed Feb. 22, 1945

3 Sheets-Sheet 1

Inventor:
Elijah B. Bush
by John J. Brezina
Attorney.

SOUND REPRODUCING DEVICE

Filed Feb. 22, 1945 3 Sheets-Sheet 2

Inventor:
Elijah B. Bush,
by John F. Brezina
Attorney.

May 26, 1953 E. B. BUSH 2,639,924

SOUND REPRODUCING DEVICE

Filed Feb. 22, 1945 3 Sheets-Sheet 3

Inventor:
Elijah B. Bush.
by John J Brezina
Attorney.

Patented May 26, 1953 2,639,924

UNITED STATES PATENT OFFICE 2,639,924

SOUND REPRODUCING DEVICE

Elijah Bryant Bush, Oklahoma City, Okla.

Application February 22, 1945, Serial No. 579,250

3 Claims. (Cl. 274—15)

The present invention relates to a sound reproducing device adapted to be intermittently operated or actuated by either mechanical or electrical means, or by manual movement and is more particularly directed to a type of apparatus which is relatively compact, portable and which may be mounted on a vehicle or other movable support or else on a fixed base.

An object of the present invention is to provide a mechanism and means to be operated electrically or mechanically, as well as manually, or by a composition of any, for reproducing sound recorded on a record.

Another object of my invention is to provide a portable mechanism of the aforesaid type, which on manual initiation will cause a sound reproducing device to be in contact with starting portion of a sound bearing record or disk and become automatically disengaged after a predetermined time of operation.

A further object of the invention is a production of a mechanism adapted to be installed in stationary position or on a movable vehicle and which includes a means for rotating a disk or cylinder, means for causing a reproducing head to engage the record and means to disengage said head after a predetermined interval, said mechanism adapted to make announcements to inform persons and to attract attention, as for example, announce the presence or arrival of milk men, post men, taxi cabs or other vehicles.

A still further object is to provide selectively operable means or mechanism to communicate information which has been recorded on a record such as a disk, by means of sound, signal or words.

The above, other and further objects of the invention will be apparent from the following description and accompanying drawings.

The invention has herein been illustrated and described as exemplifying an apparatus to reproduce relatively short messages or other sounds, although it is not so limited.

Figure 1:
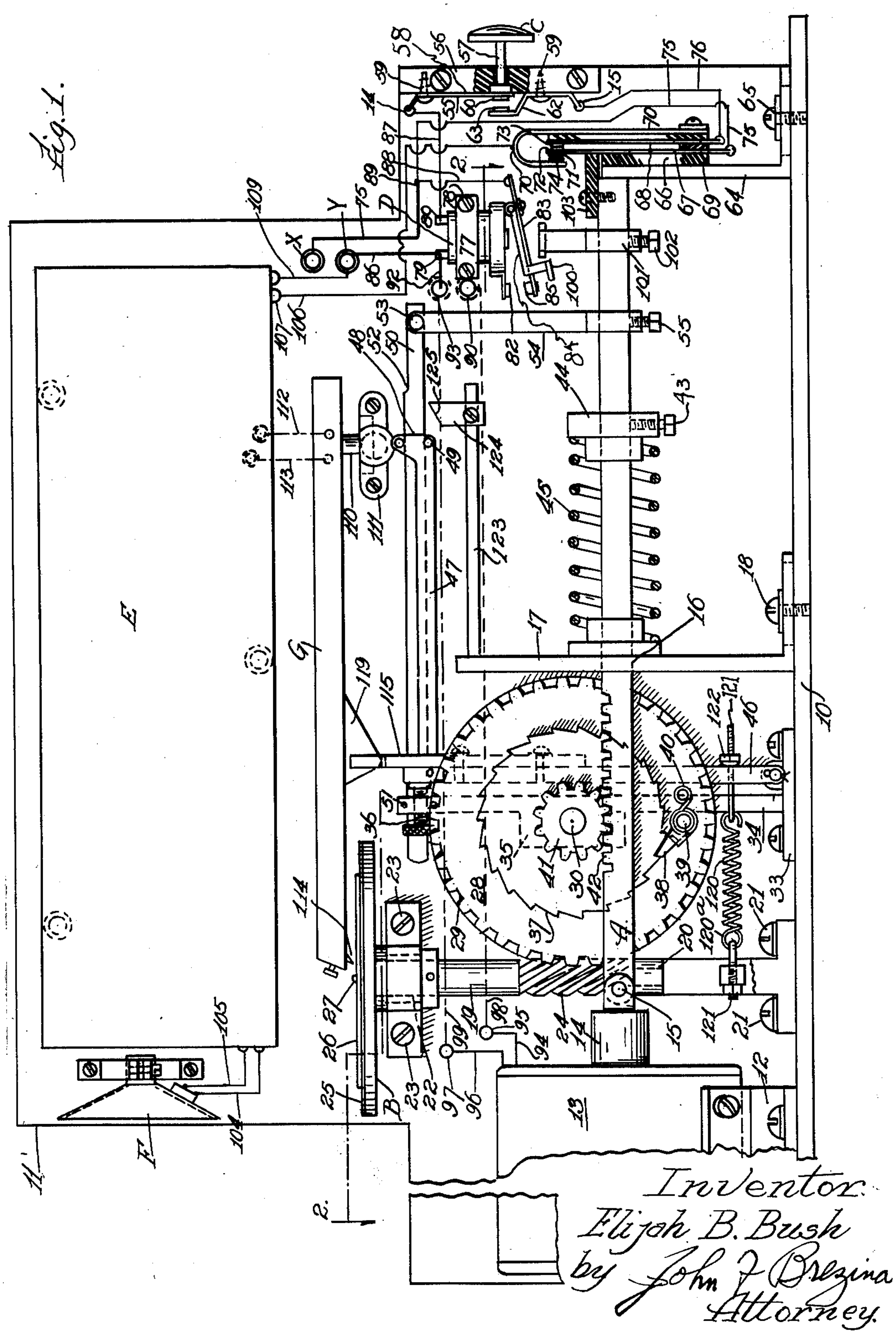
Fig. 1 is a side elevational view of the apparatus of the present invention as the same appears in a casing, with certain parts of the casing removed to show its interior.

The apparatus is enclosed in a casing having a base 10 and a rear wall 11. For clarity the end, top and front walls have been omitted as these form no part of the invention.

Supported on a suitable base 12 is a solenoid 13 having a core 14 arranged to work in horizontal direction. The core is pivoted at 15 to a horizontally movable bar A, supported intermediate its length by a bearing 16 carried by an upstanding post 17 fastened to the base 10 by screws 18.

A turn table B is mounted on the upper end of a vertical shaft 19, the lower end of which is supported by a vertical bearing 20 secured to the base 10 by bolts 21. The upper end of the shaft is carried in a journal 22 secured to the back board 11 by bolts 23. The shaft is provided with a threaded portion 24. A felt 25 is secured to the face of the turn table B for supporting record 26 in the usual manner. A center pin 27 is carried by the turn table for centering the record on the table.

For driving the shaft 19, a gear 28 having teeth 29 cut to mesh with the teeth 24 of the shaft 19 for rotating the turn table whenever the gear 28 is rotated. The teeth 24 and 29 are of the character usually employed in driving the turn tables of sound reproducing machines.

The gear 28 is loosely mounted on a cross shaft 30 which at its inner end is supported by a journal 31 and its outer end in a journal 32.

Extending upwardly from a base 33 is a post 34 which cooperates with a block 35 bolted to it to form the journal 32. The upper end of the post 34 has a threaded hole through it to receive a stop screw 36.

Keyed to the shaft 30 is a ratchet wheel 37 adjacent the gear 28. A pawl 38 is pivoted at 39 to the gear 28 and a spring 40 acts against pawl to normally maintain it in engagement with a tooth of the ratchet. Also keyed to the shaft 30 is a spur gear 41 meshing with rack teeth 42 on the bar A.

Secured to the bar A by a screw 43 is a collar 44 which may be moved along the bar A as desired. A spring 45 surrounds the bar A between the bearing 16 and the collar 44 and its tendency is to move the bar A to the right as viewed in Fig. 1.

Pivoted to the base 33 and extending upwardly therefrom is a rocker arm 46 disposed with a portion thereof against the stop screw 36 of the post 34.

Pivoted to the arm 46 is a horizontally extending bar 47 having a widened end portion 48 carrying a yoke 49 extending laterally from one side of the portion 48.

Another bar 50 extends horizontally and laterally spaced from the bar 47 and near one end extends through the yoke 49. The other end of the bar 50 is slidable in a yoke 51 on the upper end of the post 34.

As seen in Fig. 1 near the right hand end of the bar 50 a shoulder or notch 52 is formed to receive a portion of the yoke 49 on bar 47 under certain conditions, to cause simultaneous movement of these bars. The right hand end of the bar 50 is pivoted at 53 to the upper end of the post 54 which is secured to the bar A by a screw 55 to thereby allow longitudinal adjustment of the bar 50 with respect to the bar 47.

Attached to the right hand end of the back wall 11 is a block 56 of insulating material through which extends the shank 57 of a push button C. A spring conductor 58 is fastened to the block 56 by a screw 59 and bears against the inner end of the shank 57 of the push button. A contact point 60 is secured to the spring conductor 58. Also fastened to the block 56 by a screw 59 is a conductor 62 having a contact point 63 in line with the contact point 60 so as to make electrical engagement between these points when the button C is pushed.

X is one terminal and Y the other terminal for connection to a source of electrical current.

An upright 64 attached to the base 10 by a bolt 65 carries an insulating block 66. Secured to this block is a spring conductor 67 and another spring conductor 68. The two conductors are separated by insulation 69. A looped conductor 70 is also secured to the block and insulated from conductor 68. The upper end of the conductor 70 is bent back in U formation. The conductor 67 is provided with contact points 71 and 72 on each side of its free end while the conductor 68 is provided with a contact point 73. The bent end of the conductor 70 carries a contact point 74 in line with the point 71 on conductor 67.

A wire 75 leads from terminal X to conductor 67. A wire 76 leads from the conductor 62 to the conductor 68.

A relay D is mounted on the back board 11 by a yoke 77 secured to the back board 11 by bolts 78. The relay has terminals 79 and 80. Conductor 81 is supported adjacent the relay and carries a contact point 82. An arm 83 is pivoted at 84 to the relay and carries a contact 85 to engage with contact 82 under certain conditions.

A wire 86 connects the terminal Y with the terminal 79 of the relay. A wire 87 connects the spring conductor 58 with the terminal 80 of the relay. A wire 88 connects the conductor 83 with wire 75 at junction point 89. The conductor 81 is connected to a binding post 90 by a wire 91 and a wire 92 connects the wire 86 to a binding post 93.

One terminal 94 of the solenoid 13 is connected to a binding post 95 and the other terminal 96 is connected to a binding post 97. A wire 98 connects binding posts 90 and 95 while a wire 99 connects binding posts 93 and 97.

Figures 6, 7, 8:
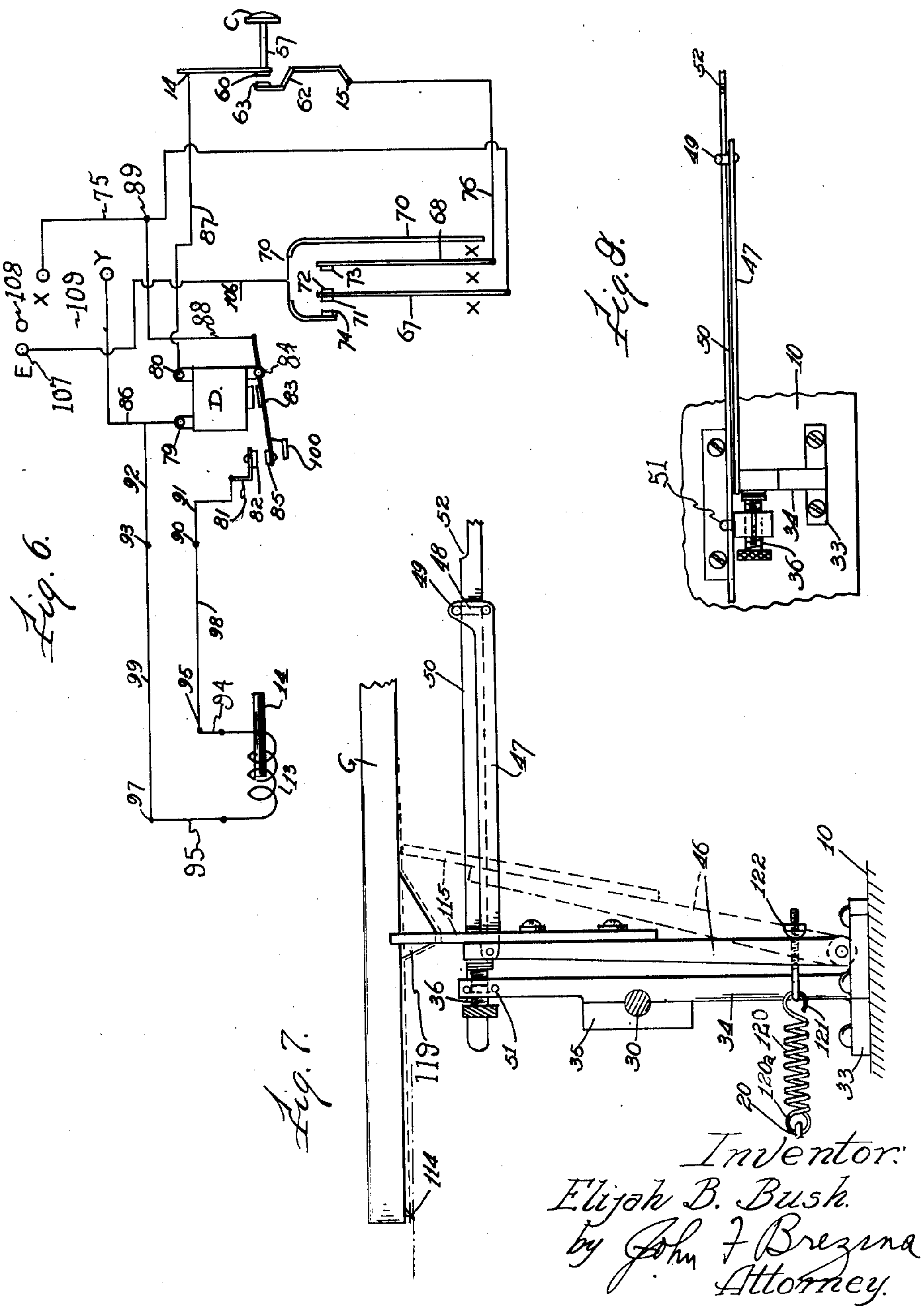
Fig. 6 is a wiring diagram illustrating the electrical connections for the actuation of the electric means of the invention.
Fig. 7 is a side elevational view of certain parts of the invention, in full lines, a normal or inoperative position of the parts; in dotted lines, relative position during operation of the mechanism.
Fig. 8 is a top plan view of Fig. 7.

Referring to Fig. 6 it will be observed that when the push button C is moved inwardly to bring the contacts 60 and 63 into engagement an electric circuit, herein called the starting circuit, is closed as follows, terminal Y, wire 86, terminal 79 of the relay, terminal 80, wire 87 to conductor 58 then conductor 62, wire 76, conductor 68, contacts 72 and 73, conductor 67 and wire 75 to X. It may be stated that under normal conditions the contacts 73 and 72 are engaged, by means to be hereinafter described.

The closing of the starting circuit energizes the relay D to moving the contact 85 into engagement with contact 82 closing the circuit through the solenoid, energizing it and pulling the bar A to the left.

The pivoted contact 83 is provided with a downwardly extending foot 100. A collar 101 is secured to the bar A by a screw 102 which collar has an upstanding part to engage underneath the foot 100 of the pivoted contact 83 when the bar A is moved to the left. The engagement just described maintains the contacts 82 and 85 in circuit closed position even though the circuit through the relay D has been broken by return of the push button C to its normal position that is with the contacts 60 and 63 separated. The collar 101 is usually arranged to maintain the contacts 82 and 85 in engagement until the bar A has been moved to desired distance to the left, the collar then moves out from underneath the foot 100 allowing it to drop by gravity thus opening the solenoid circuit and stop movement of the bar A to the left.

When the parts are in normal or inoperative position as illustrated in Fig. 1 insulated block 103 which is attached to the extremity of the bar A bears against the spring conductor 67 to maintain contacts 72 and 73 in engagement. As soon as the bar A starts its movement to the left, the spring conductor 67 then moves to the left bringing contacts 71 and 74 into engagement.

An amplifier unit E is suitably mounted on the back board 11. A speaker F is also mounted on the back board 11 and is electrically connected to the amplifier by wires 104 and 105. A wire 106 connects one terminal 107 of the amplifier to the conductor 70. Another wire 109 connects the other terminal of the amplifier to the terminal Y. Thus when the bar A is moved to the left so that contacts 71 and 74 are in engagement, an electric circuit through the amplifier is set up from X to wire 75, conductor 67, contact 71, contact 74, conductor 70, wire 106 to the terminal 107 through the amplifier through terminal 108, wire 109 through terminal Y. This circuit is closed as long as the bar A is moved away from its normal position thus energizing the amplifier through the operation of the device.

A tone arm G is mounted on a vertical pivot 110 attached to the back wall 11 by a base 111. Conductors 112 and 113 electrically connect the tone arm G with the amplifier E so that sound picked up by the needle 114 may be amplified by the speaker F.

Figures 2, 3, 4, 5:
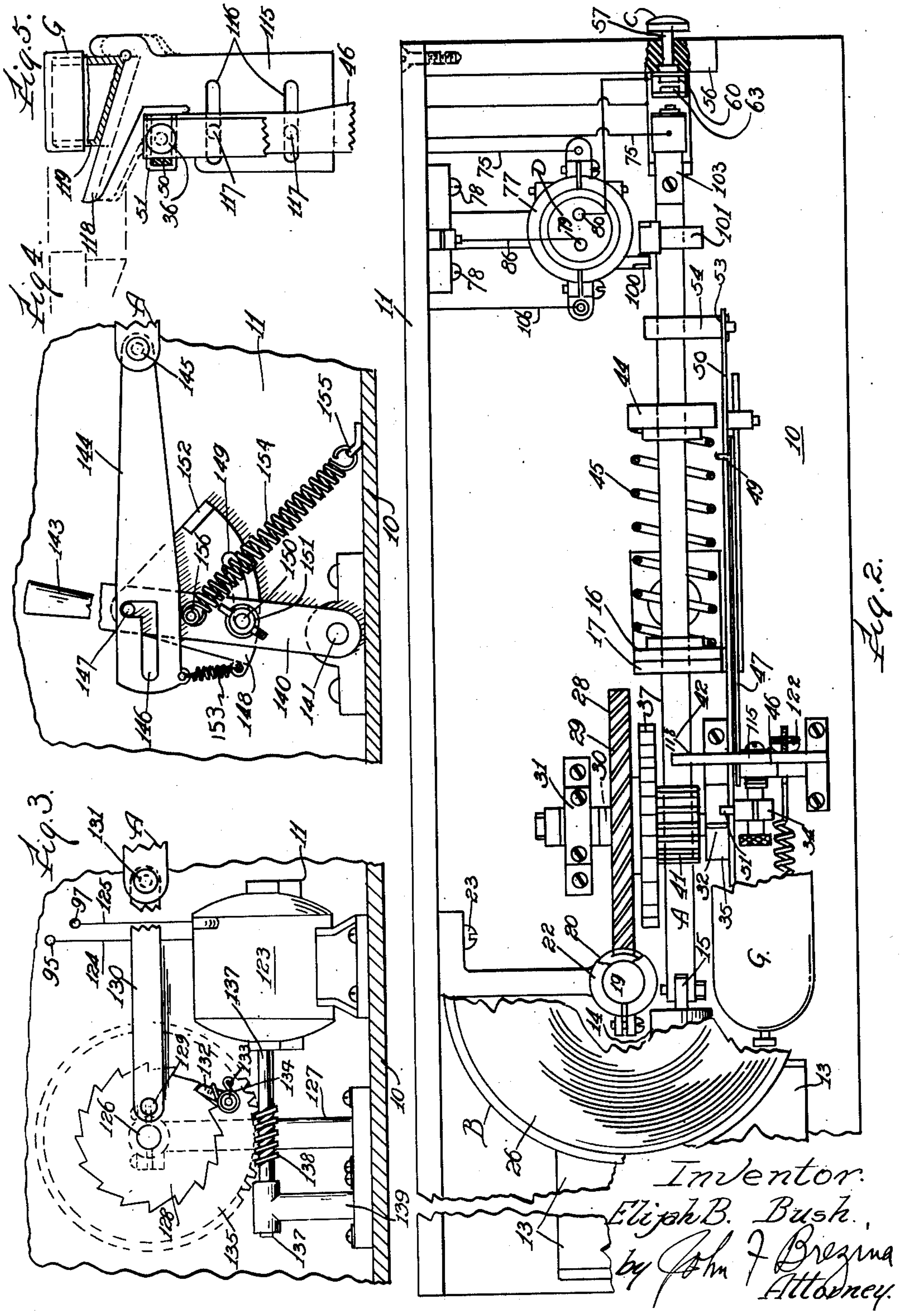
Fig. 2 is a fragmentary top plan view of the device of Fig. 1, with certain parts broken away for clarity.
Fig. 3 is a fragmentary view of the mechanism utilizing a motor for actuating certain of the movable parts.
Fig. 4 is a side elevational view of the manually operable lever mechanism which may be used in lieu of electrical means for initiating movement of certain of the parts.
Fig. 5 is an enlarged fragmentary elevational view of the upper portion of a lever mechanism for actuating the tone arm for raising or lowering the same and for returning it to starting position after a predetermined interval.

Attached to the rocker arm 46 is a plate 115 having slots 116 for receiving attaching bolts 117 to mount the plate on the arm 46 with the plane of the plate perpendicular to the plane of the paper of Fig. 1. By reason of the slot connection of the plate 115 on the arm 46 it may be adjusted as desired. The plate has an extension 118 which underlies the tone arm G with its upper surface inclined from front to back as viewed in Fig. 1 and left to right as viewed in Fig. 5. Secured to the lower portion of the tone arm G is an inclined piece 119 which rides on the inclined surface of the extension 118. Full line arrangement of Fig. 5 shows the tone arm supported by the extension 118 at its lowermost point of vertical travel, which is the normal position of the parts with the needle 114 directly over the starting point of the groove on the record 26. The dotted line position of the tone arm shows the relation of the parts when the tone arm has been swung towards the end of the travel of the needle in the groove about to be picked up by the extension 118 and returned to normal position.

A tension spring 120 connected at one end to an eye 120a secured to the post 20 and to the other end to an eye bolt 121, passing through the rocker arm 46 a nut 122 is threaded onto the bolt 121 for adjusting the tension of the spring. The function of the spring is to maintain the upper end of the rocker arm 46 in contact with the stop screw 36.

The upper end of the bracket 17 carries a horizontal member 123 which has slidably mounted on it, a block 124 having an inclined upper face 125 positioned in the path of movement of the bar 47. The block 124 is adjustable along the member 123 to trip engagement of the yoke 49 with the notch or shoulder 52 in the bar 50.

When it is desired to reproduce the sound or message impressed on the record 26, push button C is moved inwardly, that is to the left, as viewed in Fig. 1. This movement closes the starting circuit, heretofore described, to energize the relay to close the circuit to the solenoid 13. As soon as the solenoid 13 has energized, bar A is pulled to the left and the collar 101 moves underneath the foot 100 of the contact 83 of the relay to maintain the points 82 and 85 in engagement. As long as these points are in contact the solenoid will function to draw the bar A to the left. The movement of the bar in this direction rotates the spur gear 41 and the ratchet wheel 37 in clockwise direction, the pawl 31 rides over the ratchet teeth during such rotation. The movement of bar A to the left will move the bar 50 to the left bringing the notch or shoulder 52 of said bar underneath the yoke 49 of the bar 47 causing the right hand end of the bar 47 to drop into the notch. As stated, as soon as the bar A moves to the left, a circuit is established through amplifier E. When the bar A has moved to the left a distance to move the collar 101 from underneath the foot 100 solenoid circuit is broken whereupon spring 45 functions to move the bar A to the right. This movement will rotate the spur gear 41 and ratchet wheel 37 in counterclockwise direction. By reason of the engagement of the pawl 38 with the teeth of the ratchet wheel counter-clockwise rotation is employed with the gear 28 thus rotating the turn table. As soon as the bar A starts to the right bar 50 with the bar 47 moves to the right. Movement of the bar 47 to the right swings the arm 46 from its full line position of Fig. 1 to the right thus lowering the needle 114 on to the record groove. As bar A continues to move to the right arm 46 will continue to swing to the right to keep the inclined surface of extension 118 from interfering with the contact of the needle with the record. When the bar A has moved to the right a distance sufficient to cause the right hand end of bar 47 to contact block 124, engagement of the yoke 49 with the shoulder 52 of the bar 50 is broken whereupon the tension spring 119 quickly returns the rocker arm 46 in normal position against the stop screw 36. The return of the rocker arm 36 to normal position causes engagement of the inclined surface of the extension 118 of plate 115 to raise the needle from the record. Because of the inclination of the surface of the extension the tone arm then slides down on this extension until it reaches the bottom of the hill which is shown in full line in Fig. 5, in which position the needle is again over the starting point of the impressed groove on the record ready for repetition of the message by a subsequent operation of the device.

It will be understood from the description given that the time of rotation of the turn table is somewhat limited. This time could be increased by increasing the length of the rack bar A and time during which the bar is undergoing movement by reason of the exertion of spring 45.

It may be noted that my invention contemplates electrical means for moving the rack bar A in one direction and mechanical means for moving it in the opposite direction, the mechanism being set in motion by push button. The adjustment of the block 124 on the member 123 determines the length of time the needle 114 is in engagement with the record. The positioning of the collar 101 on the rack bar A determines the extent of travel of the bar to the left, which adjustment may be made in accordance with the length of the groove on the record, whereupon the record rotates till the end of the message or sound is reached.

Fig. 3 discloses another arrangement of electrical means for moving the rack bar A to the right. In this figure electric motor 123 is suitably mounted on the base 10 of the apparatus. Conductors 124 and 125 connected respectively to binding posts 95 and 97 put the motor in the circuit controlled by the energization of the relay D to actuate the motor in the same manner that the solenoid 13 is actuated which is heretofore described.

In this form of the invention a shaft 126 suitably journalled in uprights 127 carries the gear 135; ratchet wheel 128. A link 130 which is pivoted at one end by pin 129 to the ratchet wheel and its other end is pivoted at 131 to the adjacent end of the rack bar A.

It will be noted that the ratchet wheel 128 is arranged to operate in the reverse direction from the ratchet wheel 37 of Fig. 1. A detent or pawl 132 is pivoted at 133 to gear 135 and is held against a tooth of the ratchet by a spring 134. The gear 135 and the ratchet wheel are loose on the shaft 126. The motor shaft 137 is provided with a worm 138 in mesh with the gear 135. The outer end of the motor shaft is supported by a pin 139. The arrangement is such that when the motor 123 is energized the gear is moved counterclockwise, such movement causing counterclockwise movement of the ratchet wheel pulling the rack bar A to the left. The relationship of the collar 101 to the foot 100 of the relay is such that the motor circuit is opened as the pin 129 is slightly beyond dead center, that is to say a little more than 180 degrees in counterclockwise direction as viewed in Fig. 3.

Fig. 4 illustrates a manually operable mechanism which may be used instead of the electrical means, heretofore described, for moving the rack bar A to the left. A vertically extending lever 140 is pivoted at 141 to a base plate secured to the base 10 of the casing. A handle 143 is at the upper end of the lever. A link 144 is pivoted at 145 to the adjacent end of the rack bar A. The link has, near its other end, an L-shaped slot 146 in which works a pin 147 secured to the lever 140. Pivoted to swing on the pin 147 is a triangularly shaped plate 148 which is provided with an arcuate slot 149 which receives a bolt 150 secured in the lever 140. Bolt 150 and lever 140, which bolt has a wing nut 151 on it so that the angular relationship of the plate 148 with respect to the lever 140 may be adjusted. The plate 148 has an upturned lug 152 disposed to engage the lower margins of the link 144 under certain conditions. A spring 153 is connected between the link 144 and the plate 148 to normally urge the plate towards the left hand end of the link. A tension spring 154 is anchored at 155 to base 10 and its other end is secured to a pin 156 of the lever 140. This spring functions to move the lever 140 to the right, as viewed in Fig. 4.

*Operation of Fig. 4*

The position of the parts shown in Fig. 4 is the normal position with the rack bar A at its limit of travel to the right.

To move the rack bar A to the left the operator swings the handle 143 to the left against the action of the spring 154 during which movement the plate 148 swings about bolt 150 as a pivot causing engagement of lug 152 with the link 144 to raise the left hand end of the link out of engagement with the pin 147 thus discontinuing pull of the rack bar A to the left. When this condition occurs the operator releases his grip of the lever 140 whereupon the spring 45 moves the rack bar A to the right to rotate the turn table.

It is to be understood that whenever the manually operable starting unit of Fig. 4 is employed, electrical connections for the solenoid or motor are omitted. When the arrangement of Fig. 4 is employed a sufficient amount of wiring and electrical connections are necessary to supply electric current to the amplifier as the bar A is moved to the left. In other words electrical connections must be established between the contacts 71 and 74 to close the amplifier circuit.

The invention has been described herein more or less precisely as to details, and it is to be understood that the invention is not limited as the parts may be rearranged or equipped substantially without departing from the spirit or scope of the invention.

I claim:

1. In a structure of the class described including a turn table and tone arm having a lower inclined surface, means for rotating the table including a rack bar and a threaded spindle and gear means operatively connecting said rack bar and threaded spindle, and means for lifting and for lowering the tone arm and returning it to a position over the starting point of a record, including an automatically returnable rocker arm pivoted at its lower end and swingable in a vertical plane and having its upper part thereof contactable with said inclined surface, a second bar extending upwardly and operatively connected to said rack bar and adapted to be moved thereby, and a third bar having one end connected to said rocker arm and movable by said second bar, the movement of said rack bar in one direction resulting in the movement of said third bar with respect to said inclined surface to permit gravity lowering of said tone arm, and means for automatically disconnecting said third bar from said second bar to thereby permit said rocker arm to return to starting position, a plurality of electrical circuits adapted to connect a sound amplifier and said tone arm; and electrical switches mounted in said circuits for opening and closing said circuits and projecting means connected to said rack bar and adapted to open and close said switch means upon movement of said rack bar.

2. In a structure of the described class including a turn table and tone arm having a lower inclined surface, and means for rotating the table, a swingable rocker arm stationarily pivoted at its lower end; lever means for returning said rocker arm to the starting position; a portion of said lever means being engageable with said rocker arm; a horizontally movable bar operatively connected to said table rotating means and operatively connectable to said rocker arm, the movement of said bar in one direction being adapted to cause said rocker arm to move to cause lowering of said tone arm; a block mounted below said rocker arm and in the path of movement of said rocker arm, the engagement of said block with said rocker arm causing said rocker arm to disconnect from said horizontally movable bar whereby said rocker arm returning means will return said rocker arm to starting position with a resultant elevation of said tone arm.

3. In a disk type sound reproducing means having a turn table for a disk, a spindle on which said turntable is mounted; said spindle having spiral teeth thereon, means for rotating the turn table including a reciprocable rack bar, a pair of rotatably mounted concentric gears operatively connecting said rack bar and said spiral teeth of said spindle, spring means for moving said rack bar in one direction, a pivotally mounted tone arm; an upwardly extending arm adjustably connected to said rack bar; a recessed horizontally extending bar connected at one end thereof to said arm; a horizontally adjustable bar slidably connected at one end thereof to said last mentioned horizontal bar; an upwardly extending arm pivoted at its lower end and having its upper end slidably engaging said tone arm, said slidably mounted bar being adapted to be moved horizontally to horizontally move said upwardly extending bar whose upper end engages said tone arm to thereby raise and lower said tone arm, the movement of said rack bar in one direction being adapted to move said bars and said levers to lower said tone arm.

ELIJAH BRYANT BUSH.

References Cited in the file of this patent

UNITED STATES PATENTS

| Number | Name | Date |
|---|---|---|
| 732,820 | Birnbaum | July 7, 1903 |
| 896,950 | Stinson | Aug. 25, 1908 |
| 1,202,312 | Prout | Oct. 24, 1916 |
| 1,358,709 | Dalrymple | Nov. 16, 1920 |
| 1,391,315 | Gordon | Sept. 20, 1921 |
| 1,407,547 | Kellogg | Feb. 21, 1922 |
| 1,440,634 | Seabolt | Jan. 2, 1923 |
| 1,855,173 | Ashworth | Apr. 26, 1932 |
| 1,861,066 | Rees | May 31, 1932 |

FOREIGN PATENTS

| Number | Country | Date |
|---|---|---|
| 13,125 | Austria | Mar. 1, 1903 |
| 666,163 | France | May 14, 1929 |
| 114,471 | Australia | Dec. 23, 1941 |